US008612428B2

(12) United States Patent
Ito

(10) Patent No.: US 8,612,428 B2
(45) Date of Patent: Dec. 17, 2013

(54) IMAGE RANKING BASED ON POPULARITY OF ASSOCIATED METADATA

(75) Inventor: Yousuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 12/777,903

(22) Filed: May 11, 2010

(65) Prior Publication Data
US 2010/0293157 A1 Nov. 18, 2010

(30) Foreign Application Priority Data

May 13, 2009 (JP) ................................ 2009-116900

(51) Int. Cl.
G06F 17/30 (2006.01)
G06F 3/048 (2013.01)
G06K 9/03 (2006.01)

(52) U.S. Cl.
USPC ............................ 707/727; 382/311; 715/246

(58) Field of Classification Search
USPC ..................... 707/750, 727; 382/311; 715/246
See application file for complete search history.

(56) References Cited

U.S. PATENT DOCUMENTS

| 7,602,527 | B2* | 10/2009 | Yoda et al. | 358/1.9 |
| 7,752,534 | B2* | 7/2010 | Blanchard et al. | 715/204 |
| 7,849,116 | B2* | 12/2010 | Jacobs et al. | 707/723 |
| 8,234,568 | B2* | 7/2012 | Norimatsu et al. | 715/246 |
| 8,402,031 | B2* | 3/2013 | Govani et al. | 707/748 |
| 8,411,114 | B2* | 4/2013 | Akiya | 345/641 |
| 2010/0063961 | A1* | 3/2010 | Guiheneuf et al. | 707/622 |

FOREIGN PATENT DOCUMENTS

| JP | 2004-096479 | 3/2004 |
| JP | 2005-332087 | 12/2005 |
| JP | 2006-260337 | 9/2006 |
| JP | 2007-281856 A | 10/2007 |
| JP | 2008-538842 A | 11/2008 |

OTHER PUBLICATIONS

Sean Kandel et al., "PhotoSpread: A Spreadsheet for Managing Photos", ACM CHI '08, Apr. 5-10, 2008, pp. 1749-1758.*
Risto Sarvas & Marko Turpeinen, "Social Metadata for Personal Photography", IEEE 2006, 8 pages.*
Yusef Hassan-Montero & Victor Herrero-Solana, "Improving Tag-Clouds as Visual Information Retrieval Interfaces", 2006, International Conference on Multidisciplinary Information Sciences and Technologies, 6 pages.*
Morgan Ames & Mor Naaman, "Why We Tag: Motivations for Annotation in Mobile and Online Media", 2007, ACM CHI, pp. 971-980.*

* cited by examiner

Primary Examiner — Rehana Perveen
Assistant Examiner — Scott A Waldron
(74) Attorney, Agent, or Firm — Canon USA Inc. IP Division

(57) ABSTRACT

An information processing apparatus includes a changing unit configured to change content data arranged in a predetermined region to other content data in response to a user request, a counting unit configured to count a remaining number of metadata added to content data remaining unchanged by the changing unit among a plurality of pieces of content data arranged in the predetermined region, and a ranking information generation unit configured to generate ranking information representing a degree of popularity of metadata based on the remaining number of metadata counted by the counting unit.

9 Claims, 20 Drawing Sheets

FIG. 9

| 901 | 902 | 903 | 904 | 905 |
|---|---|---|---|---|
| ID | KEY | VALUE | NUMBER OF TIMES OF ADDITION | NUMBER OF TIMES OF DELETION |
| 001 | EVENT | ANNUAL SCHOOL FESTIVAL | 34 | 10 |
| 002 | SUBJECT | SOCIAL STUDIES | 12 | 20 |
| 003 | TEACHER | PRINCIPAL | 42 | 19 |
| ... | ... | ... | ... | ... |

507 METADATA MANAGEMENT TABLE

FIG. 15B

| ID 901 | KEY 902 | VALUE 903 | NUMBER OF TIMES OF ADDITION 904 | NUMBER OF TIMES OF DELETION 905 |
|---|---|---|---|---|
| 001 | EVENT | ANNUAL SCHOOL FESTIVAL | 34 | 10 |
| 002 | SUBJECT | SOCIAL STUDIES | 12 | 20 |
| 003 | TEACHER | PRINCIPAL | 42 | 19 |
| ... | ... | ... | ... | ... |

+1 (on NUMBER OF TIMES OF ADDITION)
+1 (on NUMBER OF TIMES OF DELETION)

IMAGE RANKING BASED ON POPULARITY OF ASSOCIATED METADATA

BACKGROUND OF THE INVENTION

1. Field of the Invention

The present invention relates to an information processing apparatus for generating ranking information representing the degree of popularity of content data such as photographs as well as the degree of popularity of metadata, and also to an information processing method therefor.

2. Description of the Related Art

There is a technique called variable data print (VDP), which makes use of features of a digital image forming apparatus. This technique enables changing the content to be printed each time according to information in a database.

Print data in a VDP system is referred to as VDP data. An application which generates the VDP data is referred to as a VDP application. The VDP application provides the user with a user interface which performs page layout processing. The VDP application determines a region for arranging an object, i.e., position, size, and type (text, image, graphics, etc.) of the region since the object may change according to a database. A region whose content changes with a database record is referred to as a variable region, and a region whose content does not change with a database record is referred to as a fixed region.

For example, the user sets up an image layout rule using each column of the database so that the content of a variable region changes with a database record. For example, the user can set up the following image layout rule: when the value of "Age" in a database record is 20-29, the user arranges a photographic image for young people to the relevant region; when it is 60 or older, the user arranges a photographic image for elderly people to the relevant region.

In this way, the VDP application generates VDP data which associates each region on a page with the database and then transmits the VDP data to a digital image forming apparatus. Then, when the digital image forming apparatus receives the VDP data, it prints images according to the associations in the VDP data.

After the VDP application generates the VDP data associating each region on a page with the database, the user may want to change an image inserted into the VDP data to another photograph. Since the VDP application automatically determines images to be arranged in each region as mentioned above, images are not necessarily reflected to the VDP data as the user intends.

When the user revises a certain image on the VDP data to another one, it is very troublesome for the user to find a desired photograph by browsing all candidate photographs. One possible method for saving the effort of finding a desired photograph is to add metadata to photographs in advance and use the metadata as a search keyword to narrow down candidate photographs. In this case, a plurality of users may revise images inserted into their respective VDP data. For example, a plurality of users who received a personalized photo album revise images therein. In this case, each user will find it useful to know metadata added to a popular photograph among many other users in selecting metadata as a search keyword to narrow down candidate photographs.

Some of conventional content retrieval systems numerically represent the degree of popularity of the content itself as well as the degree of popularity of search keyword and metadata by using diverse methods.

Japanese Patent Application Laid-Open No. 2005-332087 discusses a technique for calculating which program is recommended to a user based on user's operation history information enabling effectively recommending a program to the user from the early stage of service operation. Japanese Patent Application Laid-Open No. 2006-260337 discusses a technique for giving, when a user retrieves or displays a certain content on the Internet, a score representing the degree of popularity to the content.

Japanese Patent Application Laid-Open No. 2004-096479 discusses a technique for calculating the degree of popularity of metadata and then visually presenting the degree of popularity to the user by using a tag cloud. The tag cloud is a function to display a list of metadata names in different font sizes based on the degree of popularity from all users for each piece of metadata.

Conventional techniques calculate the degree of popularity for each content based only on the number of times of using metadata as a search keyword and the number of times of selection of content by the user. However, some photographs may be retained in the VDP data since the start of the editing period (initial stage) without being replaced because they are user's favorites.

Therefore, conventional techniques cannot evaluate the degree of popularity of metadata added to a photograph or the degree of popularity of the photograph itself. Accordingly, conventional techniques have a situation that user preferences are not appropriately reflected to the degree of popularity of metadata of a photograph or the degree of popularity of the photograph itself among users.

SUMMARY OF THE INVENTION

The present invention is directed to an information processing apparatus capable of reflecting user preferences to the degree of popularity of content data such as photographs as well as the degree of popularity of metadata.

According to an aspect of the present invention, an information processing apparatus includes a changing unit configured to change content data arranged in a predetermined region to other content data in response to a user request, a counting unit configured to count a remaining number of metadata added to content data remaining unchanged by the changing unit among a plurality of pieces of content data arranged in the predetermined region, and a ranking information generation unit configured to generate ranking information representing a degree of popularity of metadata based on the remaining number of metadata counted by the counting unit.

According to another aspect of the present invention, an information processing apparatus includes a changing unit configured to change content data arranged in a predetermined region to other content data in response to a user request, a counting unit configured to count a remaining number of content data remaining unchanged by the changing unit among a plurality of pieces of content data arranged in the predetermined region, and a ranking information generation unit configured to generate ranking information representing a degree of popularity of content data based on the remaining number of content data counted by the counting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an exemplary metadata management table.

FIGS. 15A and 15B illustrate a concept of updating the number of times of addition and the number of times of deletion based on a photograph revision request from a user.

DESCRIPTION OF THE EMBODIMENTS

Various exemplary embodiments, features, and aspects of the invention will be described in detail below with reference to the drawings.

An exemplary embodiment of the present invention will specifically be described below based on an album producing system (apparatus), which produces an album personalized for each student. In the present exemplary embodiment, the degree of popularity of metadata added to a photograph is numerically represented and presented to a user. The target of numerical representation of the degree of popularity to the user is not limited to metadata. For example, the degree of popularity of a photograph itself may be numerically represented and presented to the user.

Figure 1:
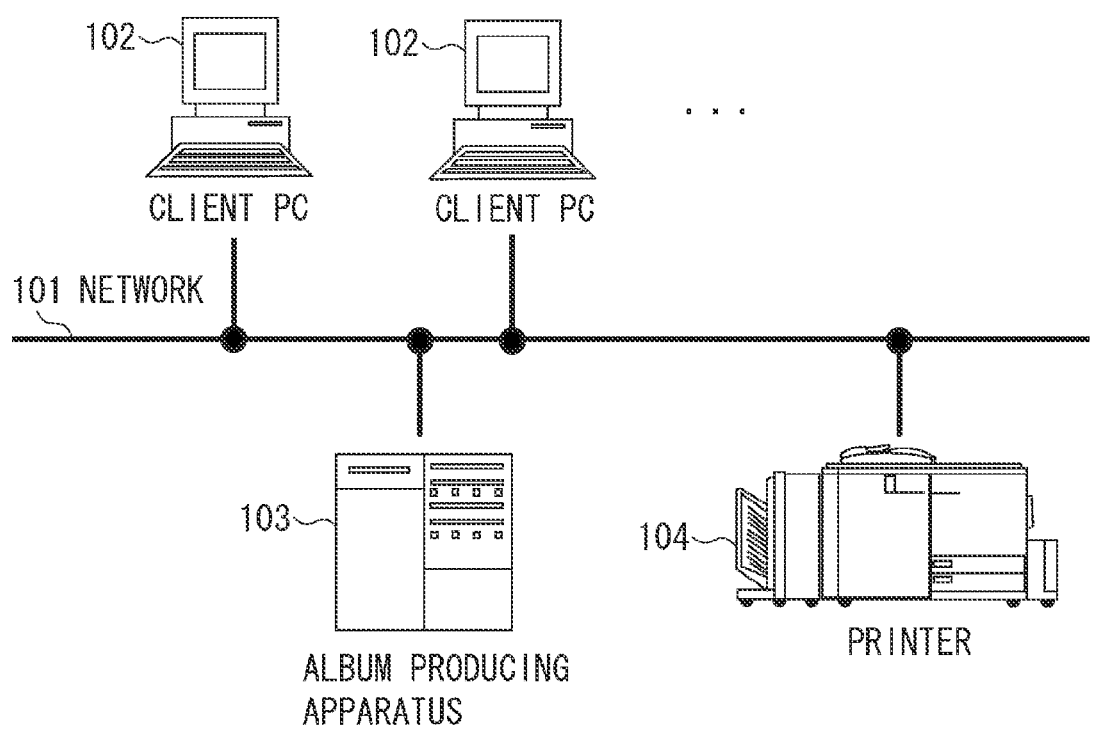
FIG. 1 illustrates an exemplary configuration of a system according to an exemplary embodiment of the present invention.

FIG. 1 illustrates an exemplary configuration of a system according to the present exemplary embodiment.

As illustrated in FIG. 1, the system according to the present exemplary embodiment includes at least one client personal computer (client PC) 102, an album producing apparatus 103, and a printer 104 connected thereto via a network 101.

The client PC 102 can transmit a print instruction to the album producing apparatus 103 via the network 101. Upon reception of the print instruction, the album producing apparatus 103 generates a print job and then transmits the print job to the printer 104 via the network 101. The printer 104 converts the received print job to bitmap data and then prints it on paper.

Figure 2:
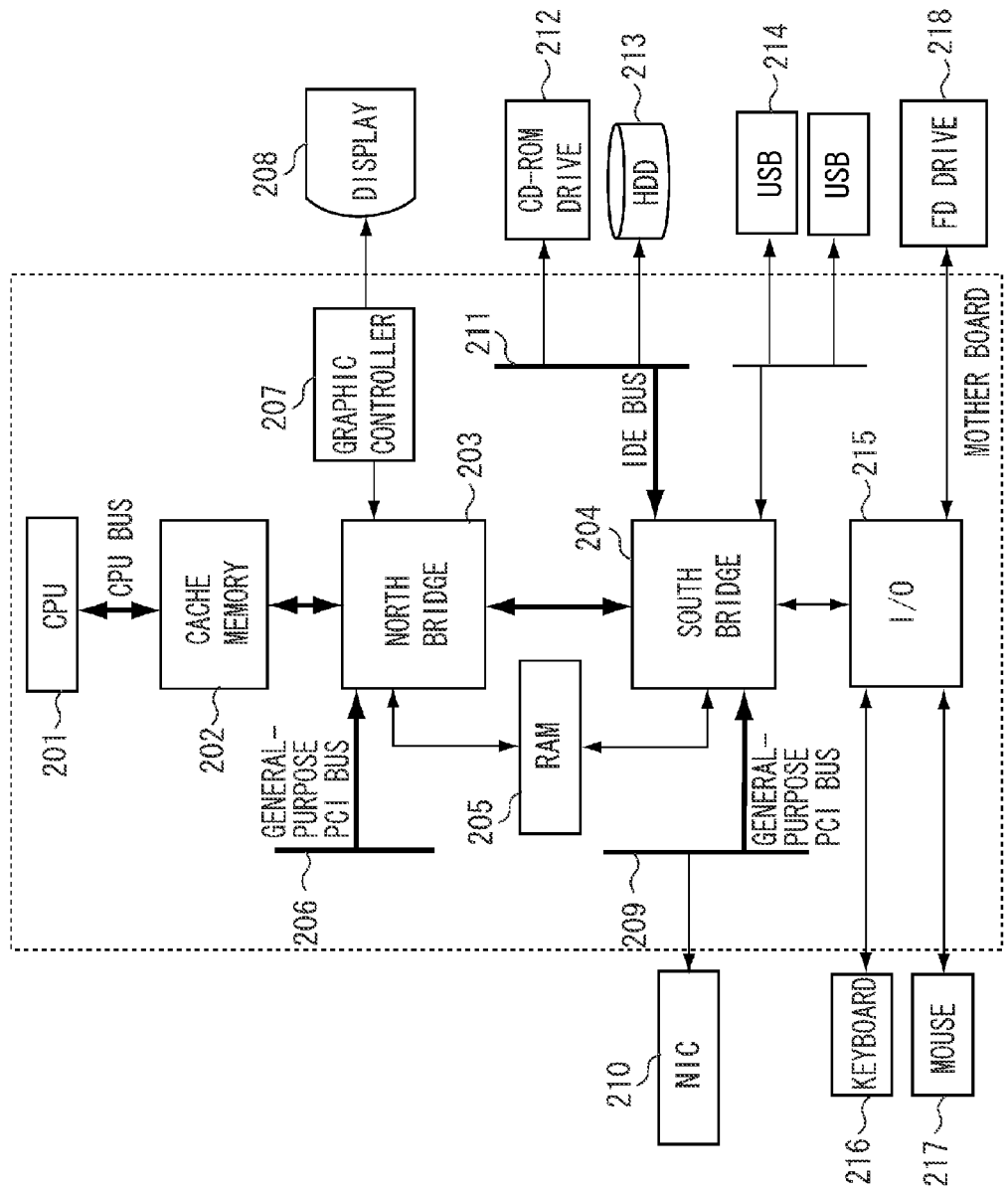
FIG. 2 illustrates an exemplary hardware configuration of a client personal computer (PC).

The client PC 102 will be described below with reference to FIG. 2. FIG. 2 illustrates an exemplary hardware configuration of the client PC 102.

Since commonly known hardware configurations of the client PC 102 include various connection methods, buses, and interfaces, the hardware configuration illustrated in FIG. 2 is an example.

A portion enclosed by dotted lines denotes a mother board. A central processing unit (CPU) 201 controls the entire software of the client PC 102 while communicating with a north bridge 203 and a south bridge 204 via a cache memory 202. A random access memory (RAM) 205 is used to exchange data between the north bridge 203 and the south bridge 204, and serves as temporary data storage areas inside the client PC 102.

The north bridge 203 is provided with a general-purpose PCI bus 206 enabling connection of an optional (post-installed) SCSI external apparatus. The north bridge 203 is also connected to a graphic controller 207 for controlling a display 208.

The south bridge 204 is provided with another general-purpose PCI bus 209 enabling network connection via a network interface controller (NIC) 210. The south bridge 204 is also provided with an IDE bus 211. Further, the south bridge 204 connects with a hard disk drive (HDD) 213 for storing control software for the client PC 102 as well as various data. The south bridge 204 also connects with a compact disc read only memory (CD-ROM), a CD recordable (CD-R) or a CD rewritable (CD-R/W) drive 212 which is useful for loading data at the time of installation of the client PC 102 and storing massive amounts of data (for archiving). The HDD 213 of the client PC 102 stores a web browser which is suitably loaded into the RAM 205 and then executed by the CPU 201.

USB ports 214 enable accessing USB external apparatuses represented by USB memory chips.

The south bridge 204 also connects with a keyboard 216, a mouse 217, and a floppy disk (F/D) drive 218 via an I/O unit 215 enabling data I/O operations.

The client PC 102 receives a user instruction from the keyboard 216 and the mouse 217, and then executes the web browser under control of the CPU 201 to process the user instruction. Then, the client PC 102 notifies the user request to the album producing apparatus 103 via the NIC 210 and the network 101. More specifically, the client PC 102 notifies user requests for logging in, uploading a photograph, editing an album layout, and printing to the album producing apparatus 103.

Figure 3:
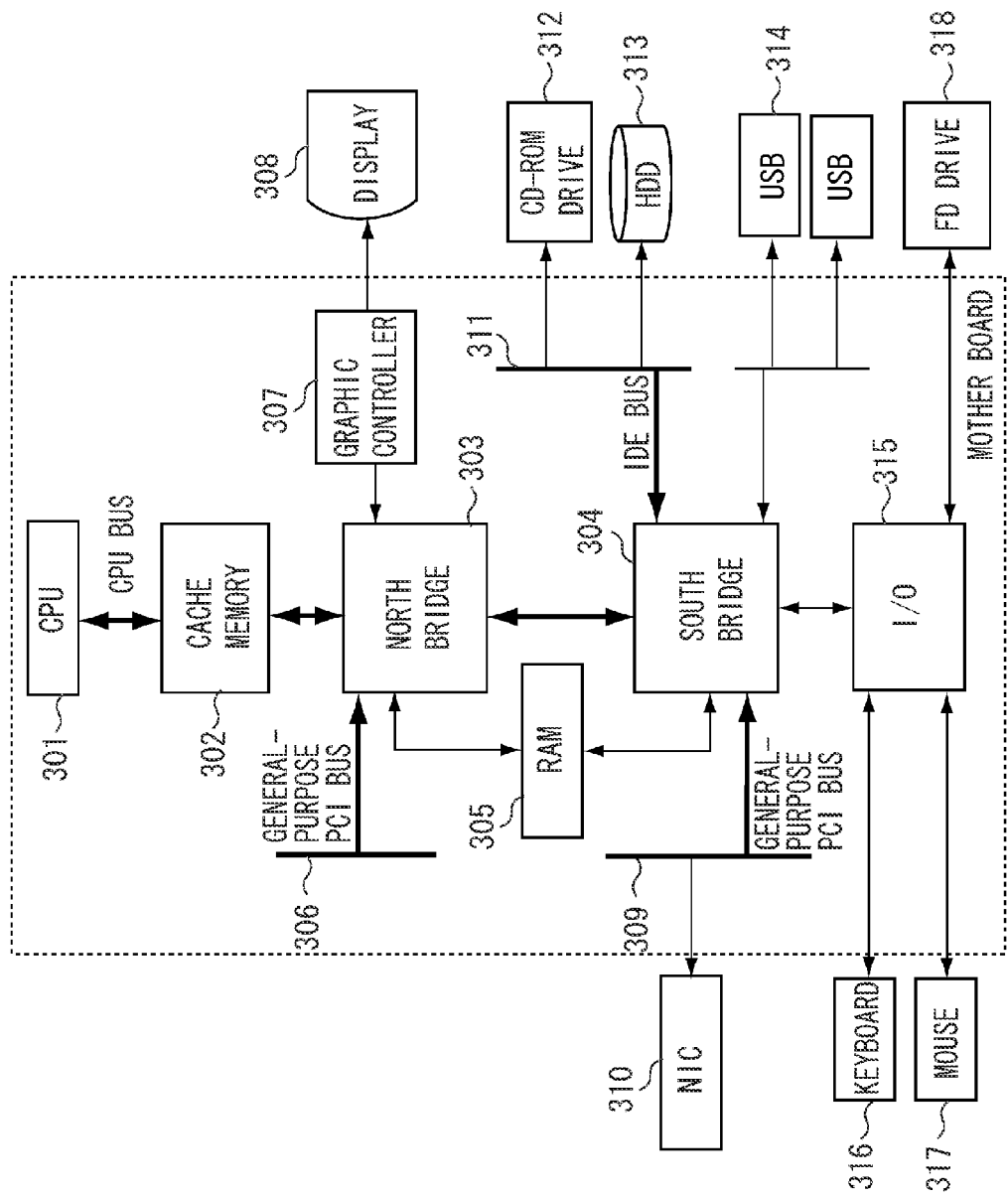
FIG. 3 illustrates an exemplary hardware configuration of an album producing apparatus.

A hardware configuration of the album producing apparatus 103, which is an exemplary information processing apparatus, will be described below with reference to FIG. 3. FIG. 3 illustrates an exemplary hardware configuration of the album producing apparatus 103.

Similar to the client PC 102, since commonly known hardware configurations of the album producing apparatus 103 include various connection methods, buses, and interfaces, the hardware configuration illustrated in FIG. 3 is an example.

A CPU 301, a cache memory 302, a north bridge 303, a south bridge 304, a RAM 305, a general-purpose PCI bus 306, a graphic controller 307, and a display 308 are similar to respective counterparts in FIG. 2.

Further, a general-purpose PCI bus 309, a NIC 310, an IDE bus 311, a CD-ROM drive 312, a HDD 313, USB ports 314, an I/O unit 315, a keyboard 316, a mouse 317, and a F/D drive 318 are similar to respective counterparts in FIG. 2.

The HDD 313 stores a web application having functions for logging in, uploading a photograph, editing an album layout, and printing as well as web server software for operating the web application. The web application and the web server software are suitably loaded into the RAM 305 under control of the CPU 301, and communicate with the web browser operating on the client PC 102 via the NIC 210 of the client PC 102, the network 101, and the NIC 310 of the album producing apparatus 103.

An overview of processing for producing an album will be described below with reference to FIG. 4.

Figure 4:
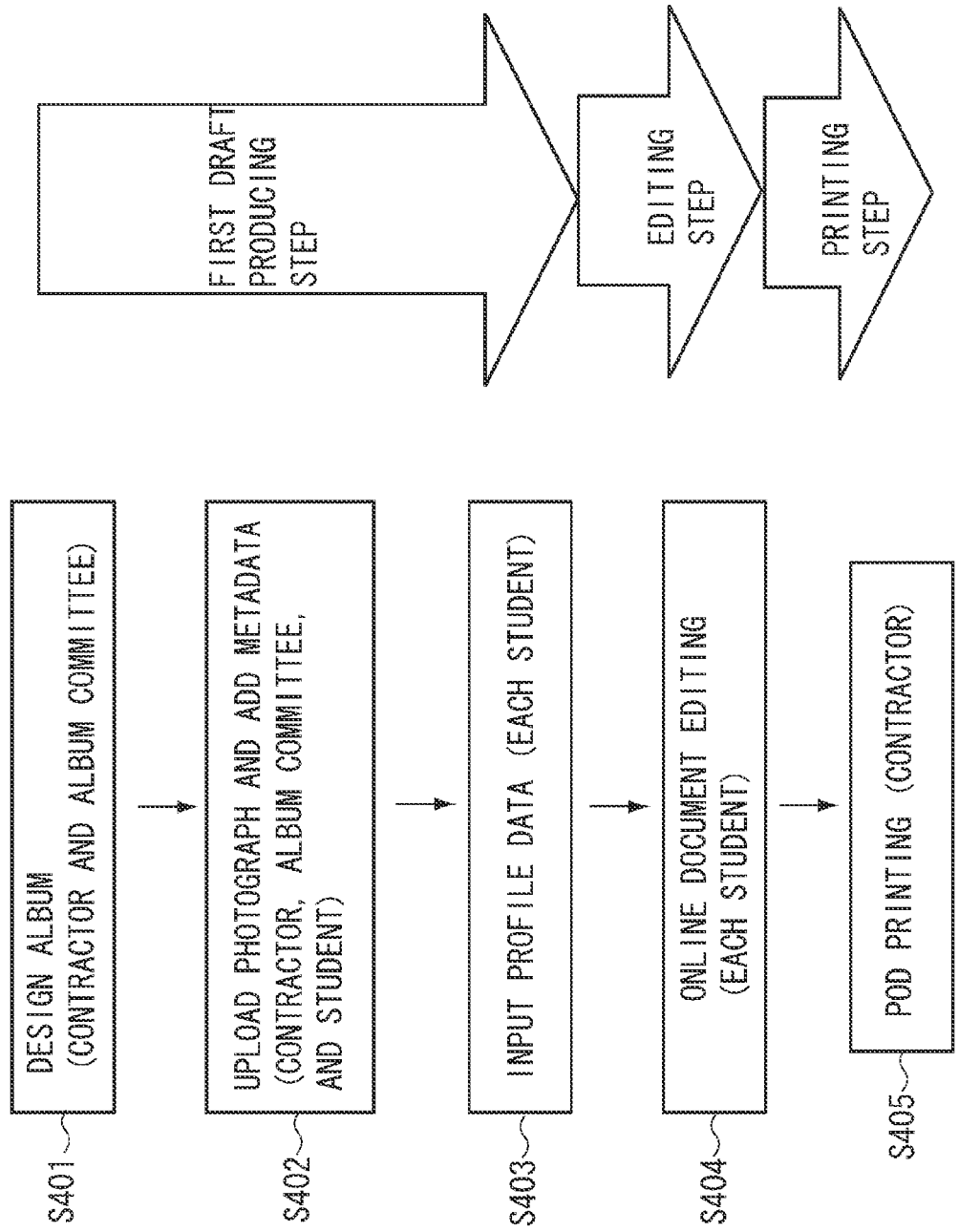
FIG. 4 illustrates an overview of processing for producing an album.

In each step in FIG. 4, the client PC 102 receives user instructions from the keyboard 216 and the mouse 217. Then, the client PC 102 communicates with the album producing apparatus 103 via the NIC 210, the network 101, and the NIC 310 by using the hypertext transfer protocol (HTTP) to notify the user request to the album producing apparatus 103. On the other hand, the album producing apparatus 103 communicates with the client PC 102 via the reverse route to notify the client PC 102 of the result of processing the user request by the web application. The client PC 102 displays the result of processing on the display 208.

Processing for producing a first draft of album data is roughly divided into four steps (S401 to S403). In step S404, at least one user checks his or her album data and changes photographs which are not his or her favorites. In step S405, album data that has undergone step S404 is printed.

Although not illustrated in FIG. 4, before performing each of steps S401 to S405, the album producing apparatus 103 receives a login request from the user and then performs login processing. The album producing apparatus 103 also receives a system setting change request from the user and then performs system setting change processing for the album producing apparatus 103.

In step S401, the CPU 301 receives an album layout data generation and editing request from the user via the network 101, and stores the album layout data in the HDD 313 of the album producing apparatus 103. The album layout data includes image frames which are regions into which a photograph or graphics is inserted and text frames which are regions into which a character string is inserted. Each of the image and text frames has an attribute for identifying that the frame is a variable or fixed region. Hereinafter, an image frame having a variable region setting is referred to as a variable image frame, and an image frame having a fixed region setting is referred to as a fixed image frame. Upon completion of processing up to step S403, photographs personalized for each student are arranged in variable image frames, and photographs common to all students are arranged in fixed image frames. Further, the conceptual data structure of the album layout data, which is exemplary page data, will be described below with reference to FIG. 6.

In step S401, the client PC 102 inputs information about album layout from the user: image/text frame setting, frame resizing values, variable/fixed region specification for each image frame, image layout rule setting for each variable image frame, and so on.

In step S402, the CPU 301 receives a photograph uploading request from the user via the network 101, and stores the photograph as photographic data and a photograph management table in the HDD 313 of the album producing apparatus 103. In step S402, the CPU 301 also receives at least zero metadata to be associated with the uploaded photograph, and stores it as the metadata management table and the photographic data/metadata correspondence table in the HDD 313. In subsequent processes, this metadata is necessary to automatically determine which photograph is to be arranged in each variable image frame.

Relations between photographic data, the photograph management table, the metadata management table, and the photographic data/metadata correspondence table will be described below with reference to FIG. 5.

In step S403, the CPU 301 stores profile data of each student received from the user via the network 101 in the HDD 313 of the album producing apparatus 103. As student's profile, the CPU 301 receives a belonging club, a favorite subject, class teacher's name, friends' names, and so on.

Student profile data will be described in detail below with reference to FIG. 7.

In step S404, the CPU 301 receives an album photograph revision request from the user via the network 101, and stores the result of editing the album layout data in the HDD 313 of the album producing apparatus 103. In step S404, the CPU 301 receives photograph revision requests from the user for a predetermined time period. In step S404, for the above-mentioned predetermined period, the user checks his or her photo album data and edits the album data, for example, by changing photographs which are not his or her favorites to other ones.

A GUI displayed to the user in step S404 will be described in detail below with reference to FIG. 12. In step S404, the CPU 301 calculates the degree of popularity of metadata at predetermined intervals. Processing for the calculation will be described below with reference to FIG. 16.

In step S405, the CPU 301 receives a print instruction from the user via the network 101 and then generates a print job. The CPU 301 transmits the print job to the printer 104 via the network 101. The printer 104 converts the received print job to bitmap data and then prints it on paper.

Processing for producing the first draft of album data is performed in steps S401 to S403. Therefore, the album producing apparatus 103 desirably receives inputs from a user who manages the overall album design, for example, an album producing contractor or a student belonging to the album committee. Referring to FIG. 4, although steps S401 to S403 are described as successive steps for the convenience of illustration, these steps may be executed in parallel or in different orders.

In step S404, since at least one user checks his or her album data and changes photographs which are not his or her favorites, the album producing apparatus 103 desirably receives inputs from a student who will receive the album.

In step S405, since the album data that has undergone step S404 is printed, the album producing apparatus 103 desirably receives inputs from a user who manages printing, for example, an album producing contractor or a student belonging to the album committee.

A block diagram of an application executed by the album producing apparatus 103, and structures of various data stored in the HDD 313 of the album producing apparatus 103 will be described below with reference to FIGS. 5 to 10.

Figure 5:
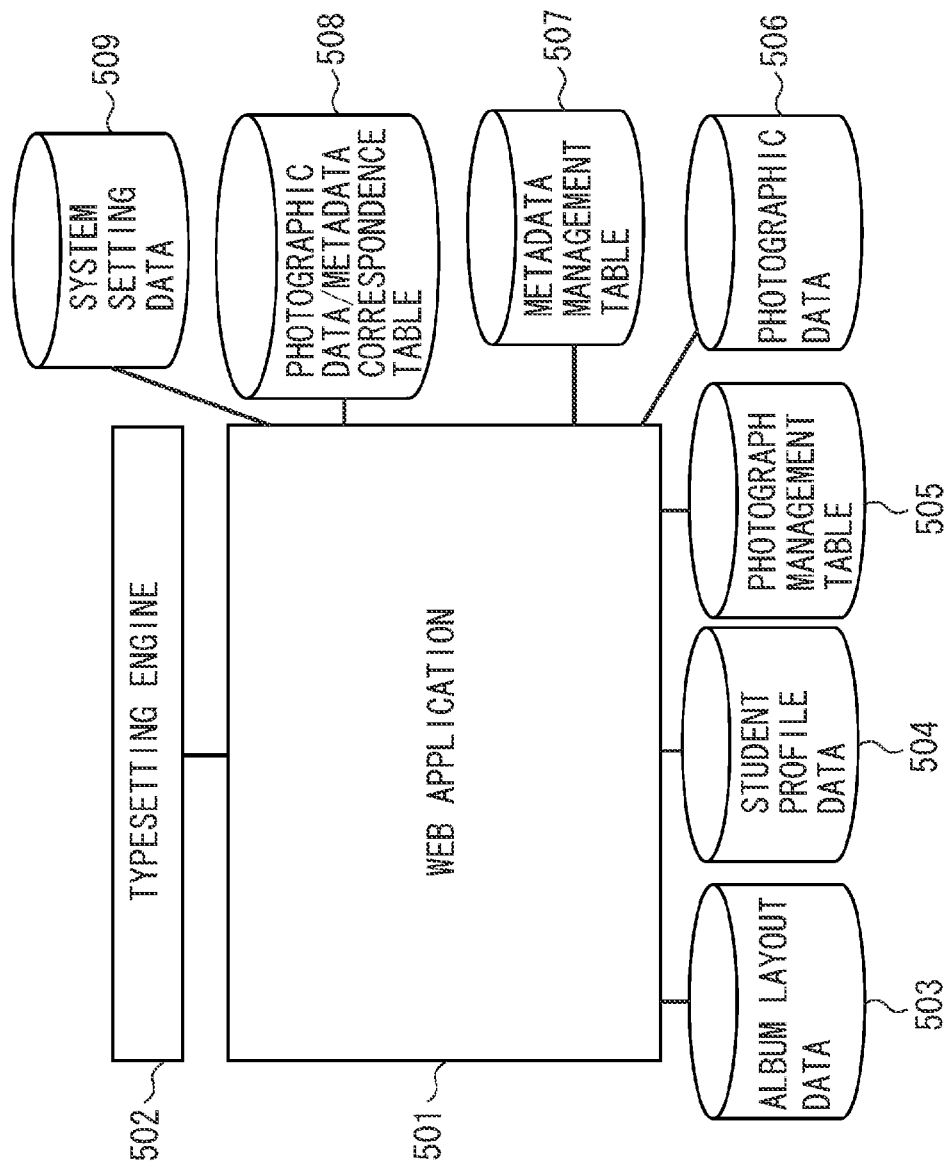
FIG. 5 illustrates program groups (software groups) executed by the album producing apparatus, and an exemplary configuration of data groups used by the program groups.

FIG. 5 illustrates program groups (software groups) executed by the album producing apparatus 103, and an exemplary configuration of data groups used by the program groups. A web application 501 is an application having functions to design and edit an album. A typesetting engine 502 is software which typesets album layout data 503 of a predetermined student based on an instruction from the web application 501 and then returns the result of typesetting to the web application 501. The web application 501 and the typesetting engine 502 stored in the HDD 313 are suitably loaded from the HDD 313 into the RAM 305 and then executed by the CPU 301.

Referring to FIG. 5, the album layout data 503, student profile data 504, a photograph management table 505, photographic data 506, and a metadata management table 507 are stored in the HDD 313. A photographic data/metadata correspondence table 508 and a system setting data 509 are also stored in the HDD 313. The storage medium for storing these pieces of data is not limited to the HDD 313. For example, at least one database server computer is configured on the network 101, and these pieces of data may be stored in a storage unit on the database server computer.

Figure 6:
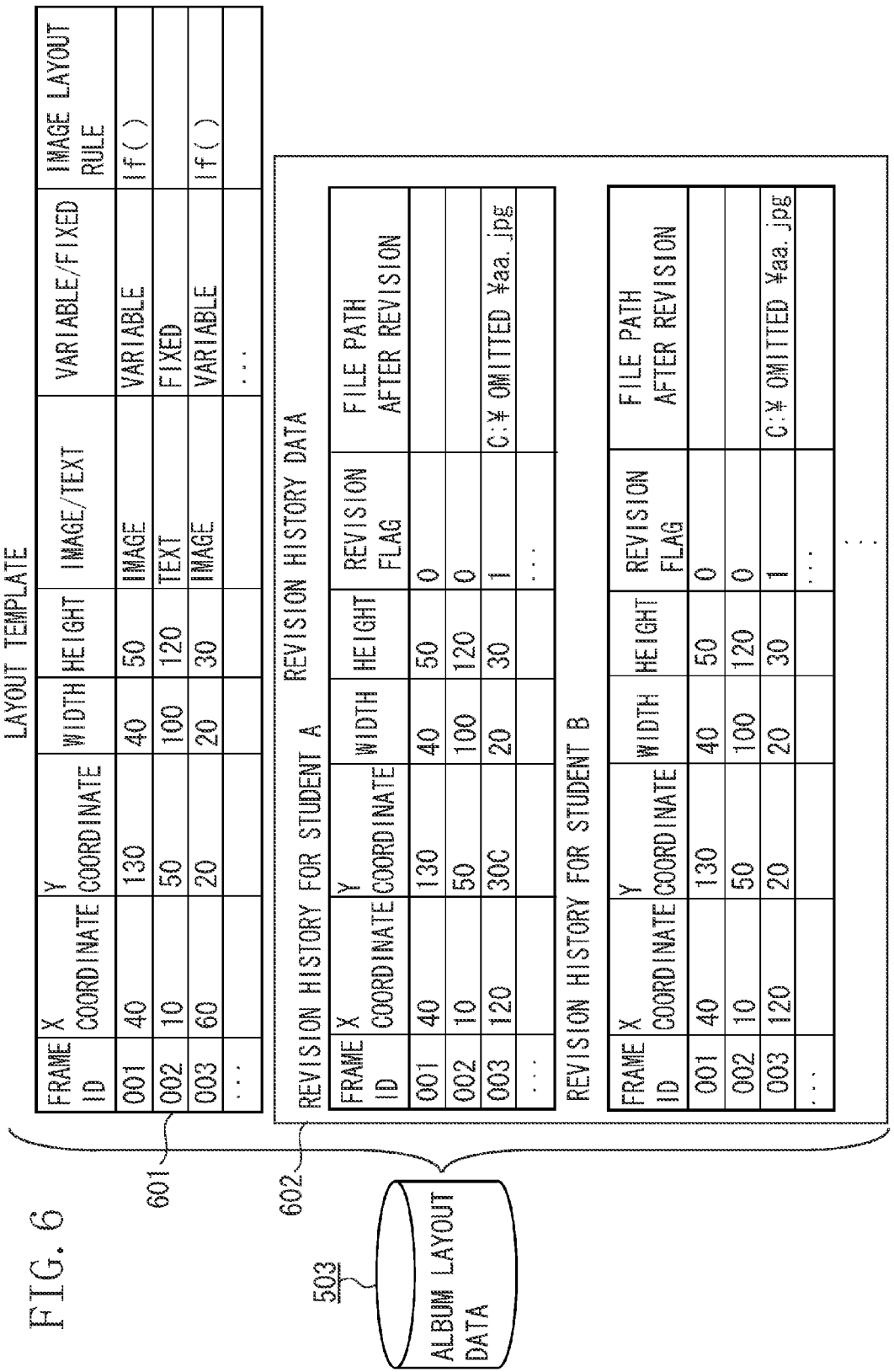
FIG. 6 illustrates an exemplary conceptual data structure of album layout data.

The album layout data 503 contains layout information of the album. FIG. 6 illustrates an exemplary conceptual data structure of the album layout data 503. The album layout data 503 contains a layout template 601 which serves as a template for all students' album layout and revision history data 602 which stores revision data applied to the album by each student. The layout template 601 contains information for each frame, such as a frame ID, coordinate values, width and height, frame type (image/text) flag, and image frame type (variable/fixed) flag. The layout template 601 further contains information such as an image layout rule associated with each variable image frame. The revision history data 602 includes a frame ID, revised coordinate values, revised width and height, a flag for identifying whether a photograph in each variable image frame has been revised, and a file path after revision.

Figure 7:
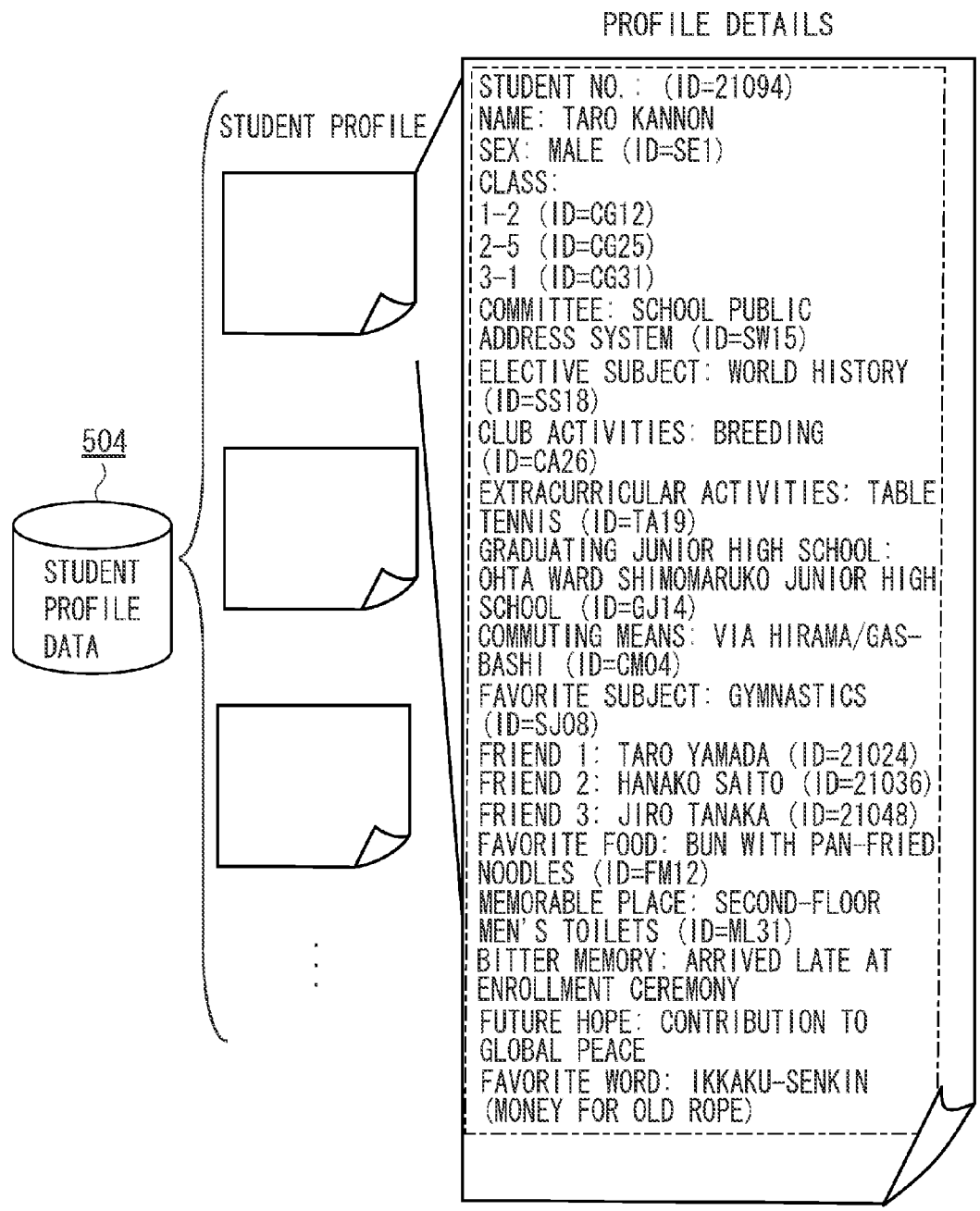
FIG. 7 illustrates exemplary student profile data.

FIG. 7 illustrates exemplary student profile data.

The student profile data 504 includes student's personal information. As illustrated in an example in FIG. 7, the student profile data 504 stores personal information for each individual student, such as student number ID, name, sex, class for each grade, belonging committee, elective subject, belonging extracurricular activities, and so on.

Figure 8:
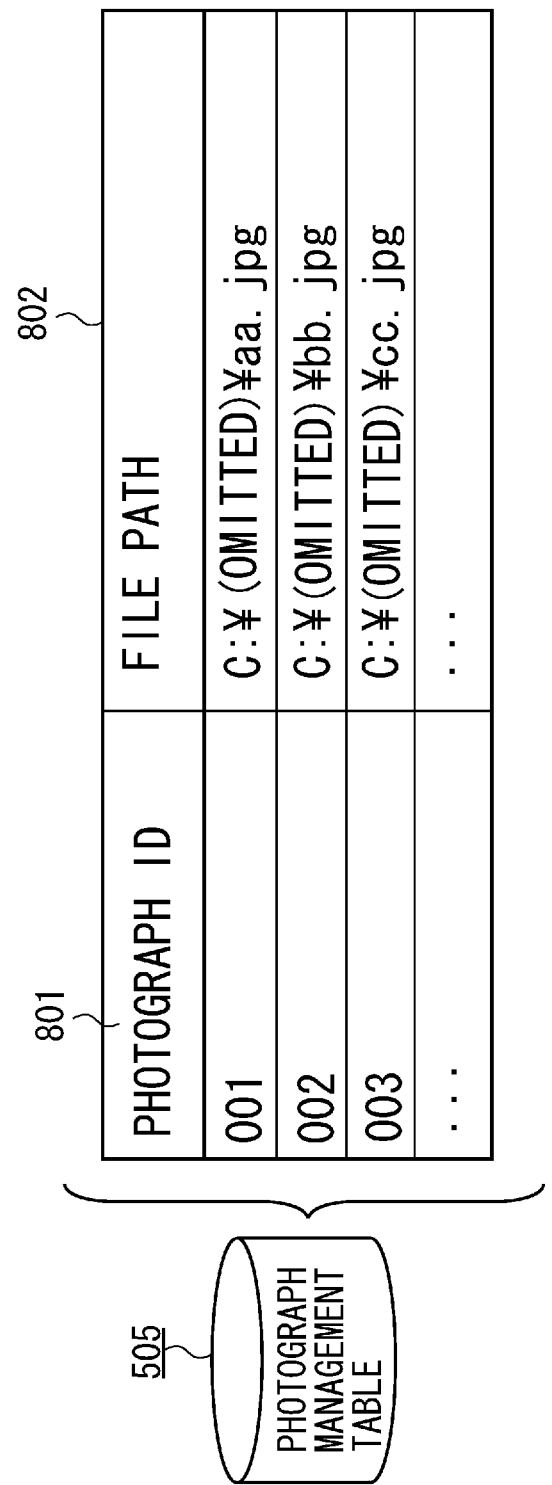
FIG. 8 illustrates an exemplary photograph management table.

FIG. 8 illustrates an exemplary photograph management table.

As illustrated in an example in FIG. 8, the photograph management table 505 stores a photograph ID 801 for the photographic data 506 uploaded by the user and a file path 802 for each photograph. The photograph ID is a unique identifier added to each photograph by the web application 501 when it is uploaded, and serves as a main key in the photograph management table 505.

The photographic data 506 contains image files such as JPEG, bitmap, and TIFF uploaded to the user.

FIG. 9 illustrates an exemplary metadata management table.

As illustrated in an example in FIG. 9, the metadata management table 507 stores information about metadata associated with each photograph in the photographic data 506 uploaded by the user. One piece of metadata includes a pair of character strings: a character string denoting a key and a character string denoting a value. The key denotes a category to which the piece of metadata belongs, and the value denotes actual information for the key. More specifically, one piece of metadata has a key "Extracurricular activities" and a value "Tennis club", and another piece of metadata has a key "Subject" and a value "Physics." The metadata management table 507 includes five fields: a field 901 for storing a metadata ID, a field 902 for storing a key, a field 903 for storing a value, a field 904 for storing the number of times of addition, and a field 905 for storing the number of times of deletion.

The number of times of addition 904 equals the count value which is incremented by one when the relevant metadata is determined to be contained in a photograph selected by the user in step S404. The number of times of deletion 905 equals the count value which is incremented by one when the relevant metadata is determined to be contained in a photograph removed from the album by the user in step S404. The number of times of addition and the number of times of deletion will be described in detail below with reference to FIGS. 15A and 15B. The metadata ID 901 is a unique identifier added by the web application 501 to metadata added by the user when uploading a photograph, and serves as a main key in the metadata management table 507.

Figure 10:
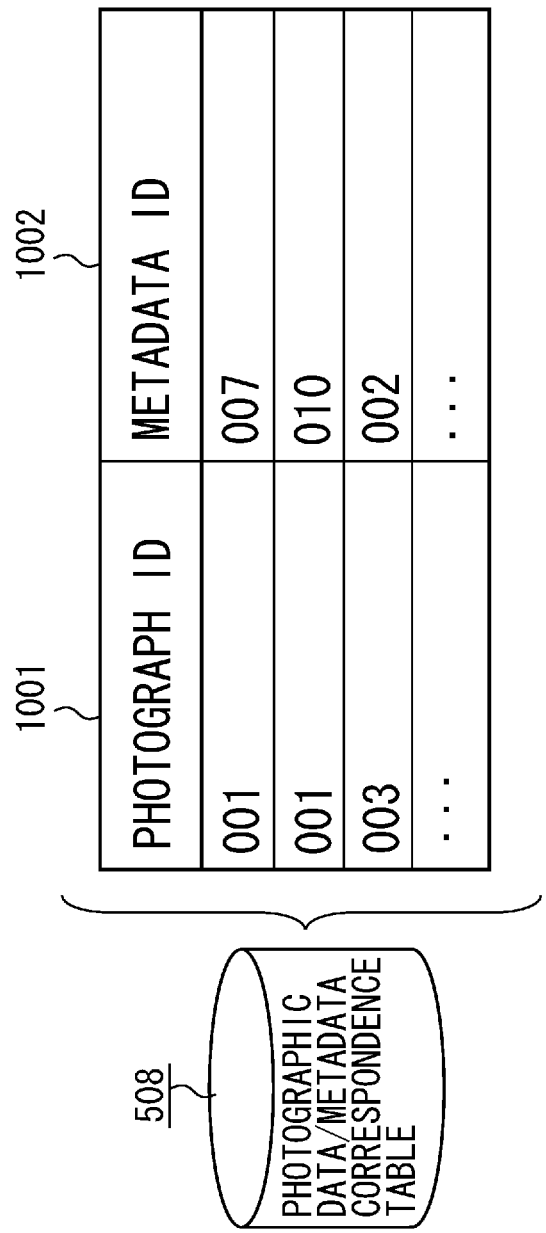
FIG. 10 illustrates an exemplary photographic data/metadata correspondence table.

FIG. 10 illustrates an exemplary photographic data/metadata correspondence table.

As illustrated in an example in FIG. 10, the photographic data/metadata correspondence table 508 stores a photograph ID 1001 and a metadata ID 1002 corresponding thereto. The photograph ID 1001 corresponds to the photograph ID 801 managed in the photograph management table 505. The metadata ID 1002 corresponds to the metadata ID 901 managed in the metadata management table 507.

The system setting data 509 stores various setting information on the album producing apparatus 103, such as login user information for managing users logging into the album producing apparatus 103, and album editing period setting.

Figure 11:
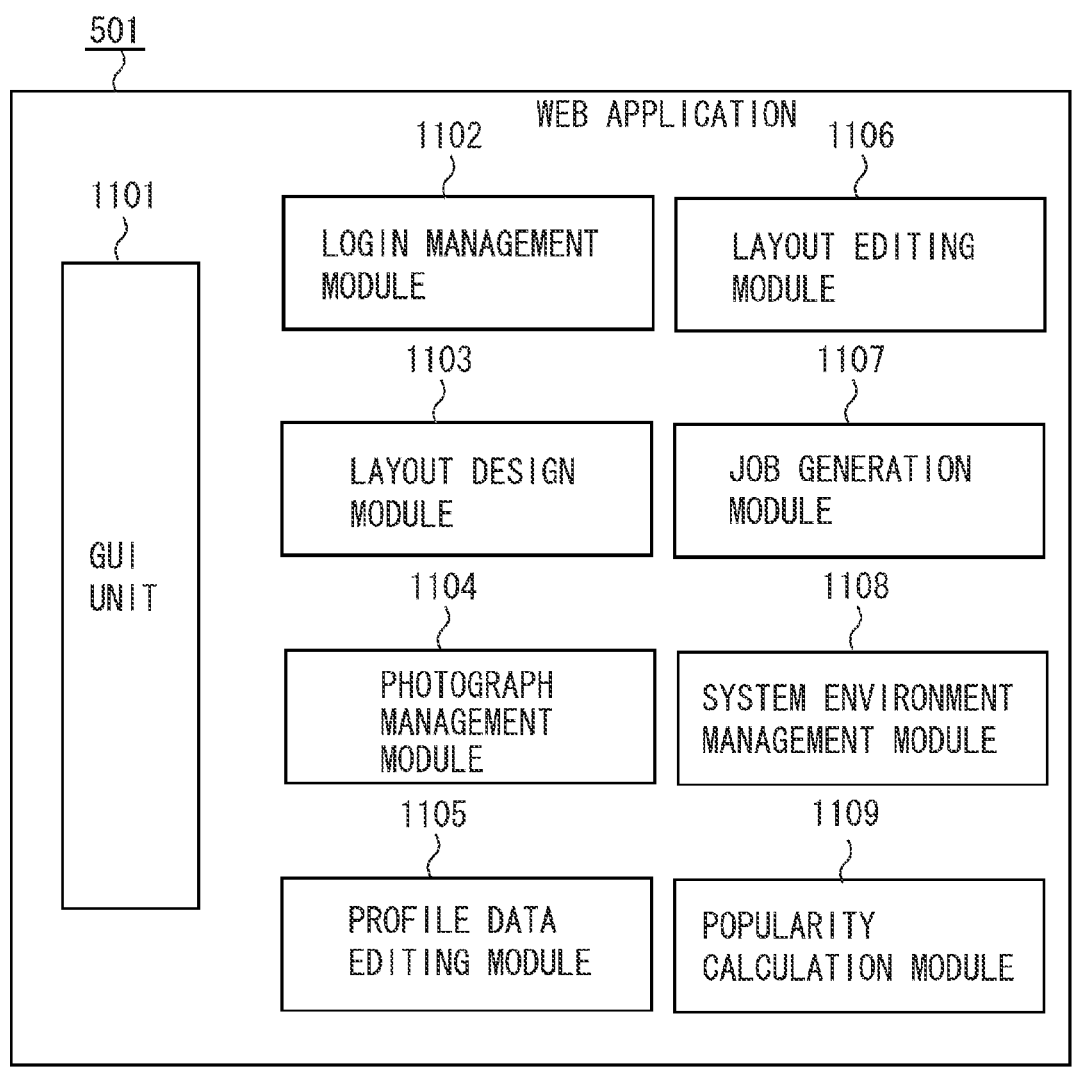
FIG. 11 illustrates an exemplary functional configuration of a web application.

A block diagram of the web application 501 stored in the HDD 313 is illustrated in FIG. 11, and each processing module will be described below with reference thereto. FIG. 11 illustrates an exemplary functional configuration of the web application 501.

As illustrated in FIG. 11, the web application 501 includes a GUI unit 1101, a login management module 1102, a layout design module 1103, a photograph management module 1104, and a profile data editing module 1105. The web application 501 further includes a layout editing module 1106, a job generation module 1107, a system environmental management module 1108, and a popularity calculation module 1109.

The GUI unit 1101 provides the user with a graphical user interface. The GUI unit 1101 will be described in detail below with reference to FIG. 12.

The login management module 1102 performs authentication when the user logs into the album producing apparatus 103.

In step S401, the layout design module 1103 receives from the user an instruction for moving an image frame, an instruction for adding and deleting an image frame, and an instruction for editing an image layout rule for each variable image frame. The layout design module 1103 reflects these instructions to the layout template 601 of the album layout data 503.

In step S402, the photograph management module 1104 receives an upload instruction from the user via the CPU 301 and then stores a photograph in the photographic data 506. The photograph management module 1104 receives a metadata input and then reflects the metadata to the metadata management table 507.

In step S403, the profile data editing module 1105 receives a profile from the user and then reflects the profile to the data for the relevant student in the student profile data 504.

In step S404, the layout editing module 1106 receives a revision of a photograph or a revision of frame size or position from the user. Then, the layout editing module 1106 reflects the result of revision to the revision history data 602 for the relevant student in the album layout data 503.

In step S405, when the web application 501 receives a print instruction from user, the job generation module 1107 performs typesetting processing for the album layout data 503 and the photographic data 506 by using the typesetting engine 502. Then, the job generation module 1107 generates a print job from the result of typesetting and then transmits the print job to the printer 104.

The system environmental management module 1108 receives a system environmental setting revision instruction from the user and then reflects relevant revisions to the system setting data 509.

The popularity calculation module 1109 calculates the degree of popularity of metadata via the CPU 301. A method for calculating the degree of popularity will be described in detail below with reference to FIG. 16.

Processing in step S404 (album editing) performed by the GUI unit 1101 will be described in detail below with reference to FIG. 12.

Figure 12:
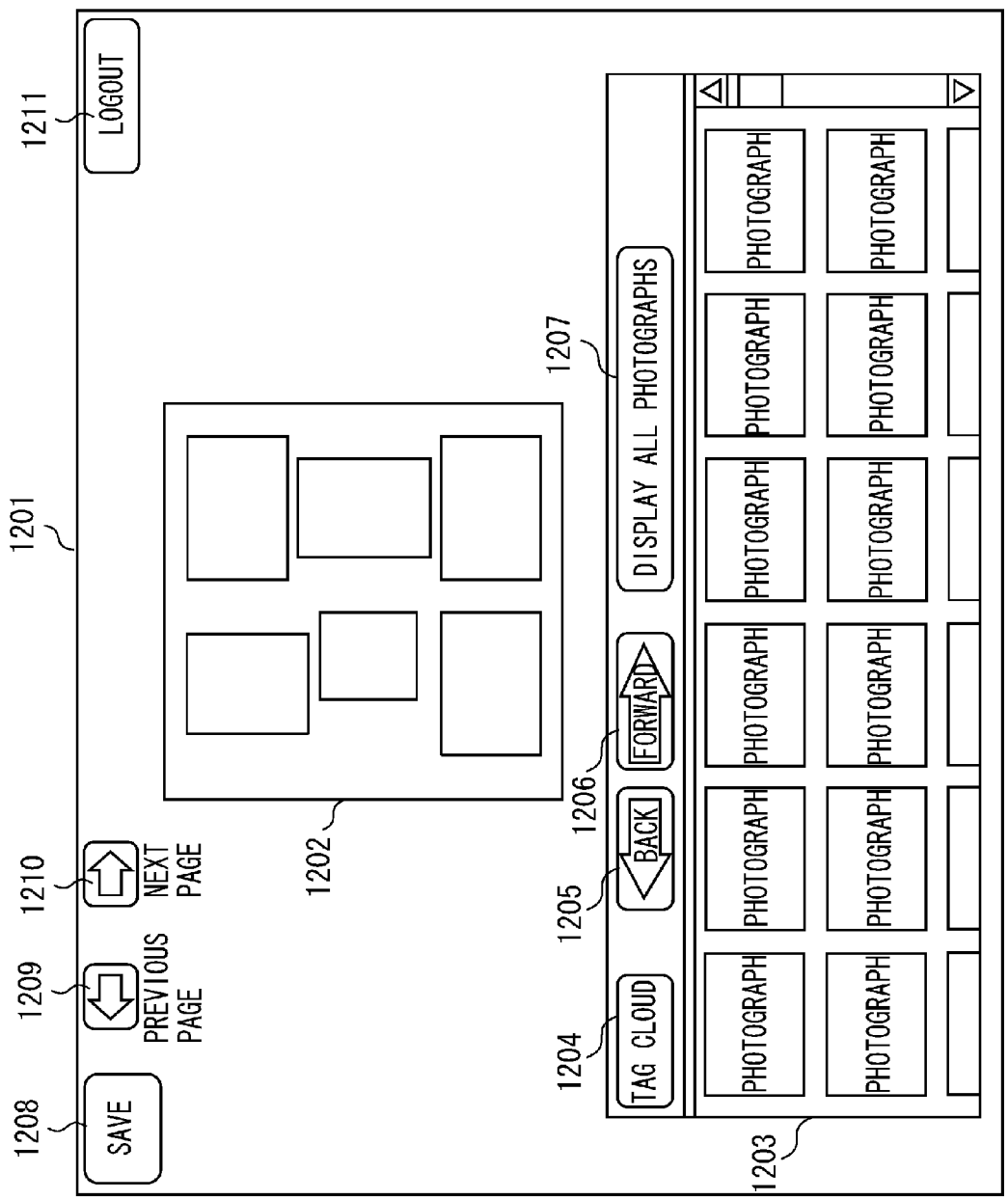
FIG. 12 illustrates an exemplary layout editing screen.

FIG. 12 illustrates an exemplary layout editing screen.

An album layout display region 1202 displays the layout of the album and photographs arranged therein.

The candidate photograph list display region 1203 displays a list of candidate photographs via the CPU 301. When the CPU 301 receives a selected variable image frame from the user, the candidate photograph list display region 1203 displays candidate photographs to be inserted into the variable image frame. The CPU 301 sorts the photographs in order of priority according to the image layout rule with reference to the layout template 601 for the user-selected variable image frame.

Procedures for changing a photograph displayed in the album layout display region 1202 to a photograph in the candidate photograph list display region 1203 will be described below. Upon reception of a photograph selection request for the album layout display region 1202 from the user, the CPU 301 displays in the candidate photograph list display region 1203 candidate photographs for the variable image frame in which a selected photograph is arranged. Then, upon reception of a photograph selection request for the candidate photograph list display region 1203 from the user, the CPU 301 displays a state where the former photograph (the selected photograph) is deleted from the album and then replaced by the latter photograph (a candidate photograph) in the album layout display region 1202.

A button 1204 is used to instruct displaying a tag cloud. The tag cloud is a function to display a list of metadata names in different font sizes based on the degree of popularity from all users for each piece of metadata.

Figure 13:
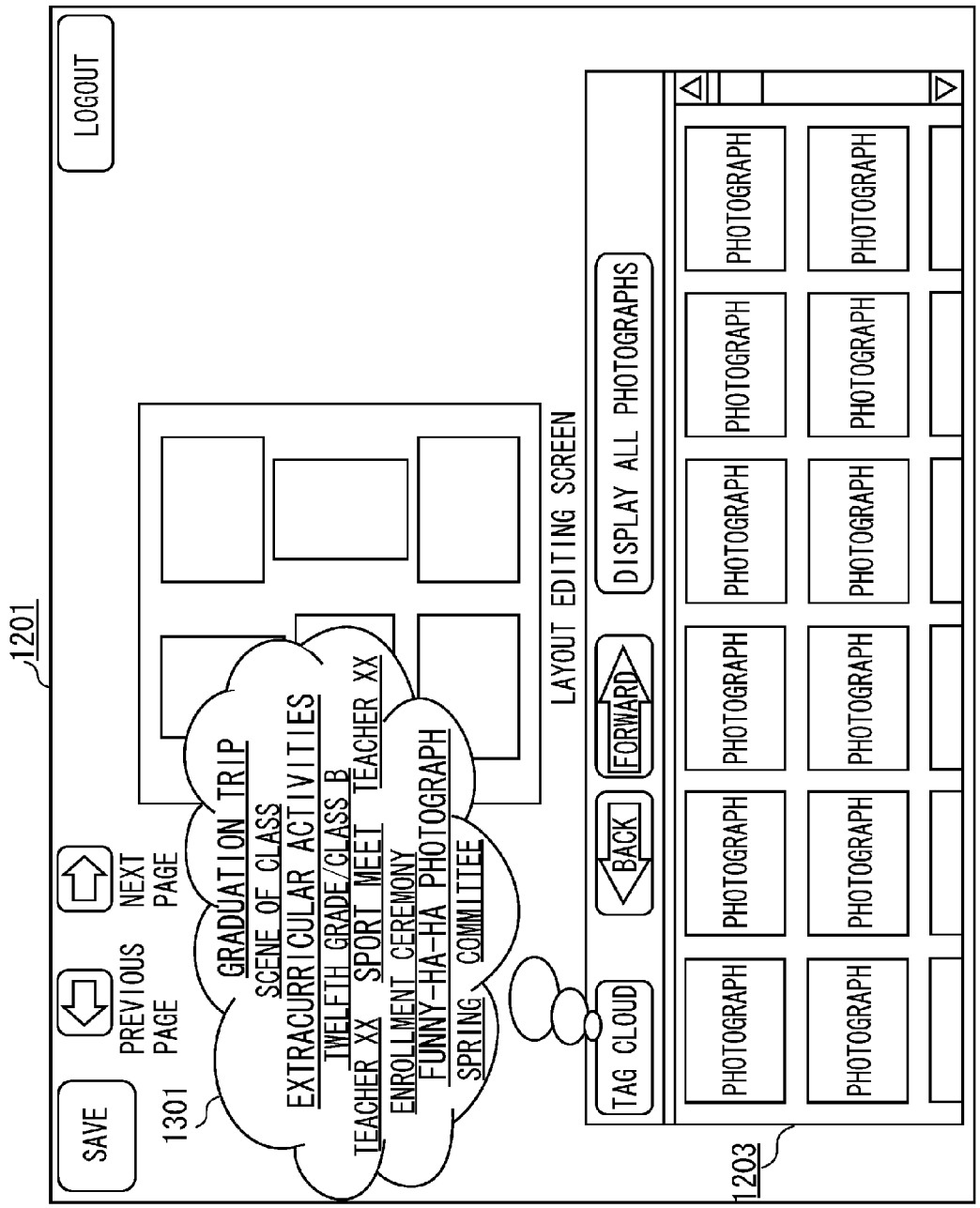
FIG. 13 illustrates an exemplary tag cloud.

FIG. 13 illustrate an exemplary tag cloud displayed in the GUI unit 1101. Referring to a tag cloud 1301 in FIG. 13, the higher the degree of popularity of metadata, the larger the font size of the metadata name display. Thus, the tag cloud 1301 enables the user to easily recognize highly popular metadata in visual way.

Figure 14:
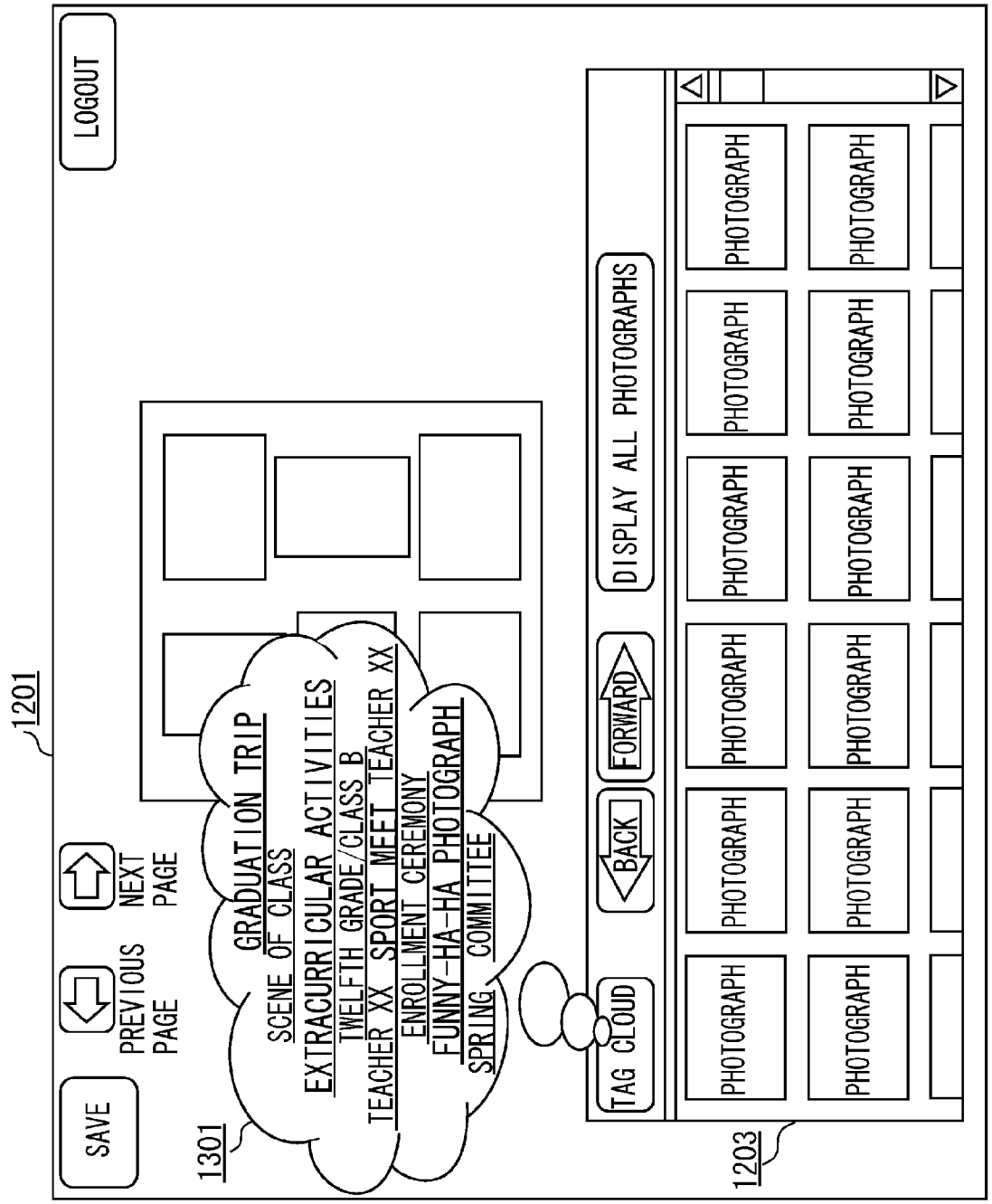
FIG. 14 illustrates an exemplary result of narrowing down to photographs having metadata added thereto.

Upon reception of a request to select a metadata name displayed in the tag cloud 1301 from the user, the CPU 301 displays in the candidate photograph list display region 1203 the result of narrowing down to photographs having the relevant metadata added thereto, as illustrated in FIG. 14. FIG. 14 illustrates an exemplary result of narrowing down to photographs having metadata added thereto. The use of this function enables saving the effort of finding a desired photograph by browsing all photographs arranged in the candidate photograph list display region 1203. To display the tag cloud 1301, it is necessary to numerically represent the degree of popularity of metadata in advance. A method for calculating the degree of popularity of metadata will be described below with reference to FIG. 16. Further, a method for determining the font size of the tag cloud 1301 from the degree of popularity will be described below with reference to FIG. 20.

The method for visually presenting the degree of popularity of metadata to the user is not limited to the tag cloud 1301. For example, popular metadata may be displayed in a ranking way.

Referring to FIG. 12 again, a button 1205 is used to instruct returning the photograph list in the candidate photograph list display region 1203 narrowed down by using the above-mentioned tag cloud 1301 to the previous state.

A button 1206 is used to instruct returning the photograph list in the candidate photograph list display region 1203 once returned to the previous state by the button 1205 to the state before the button 1205 was pressed.

A button 1207 is used to instruct displaying all candidate photographs in the candidate photograph list display region 1203.

A button 1208 is used to instruct storing the current layout data in the revision history data 602 in the album layout data 503.

Buttons 1209 and 1210 are used to instruct moving to the previous page and next page, respectively, of the layout data.

A button 1211 is used to instruct logout processing.

To generate the tag cloud 1301, it is necessary to calculate the degree of popularity for each piece of metadata. A method for calculating the degree of popularity will be described below.

The CPU 301 numerically represents the degree of popularity from the three count values associated with metadata and then sums up the three degrees of popularity partially weighted. Hereinafter, the degree of popularity numerically represented from the three count values is referred to as a popularity score, and the total degree of popularity calculated by summing up the three popularity scores partially weighted is referred to as a total popularity score. The processing by the CPU 301 is not limited to calculating a total popularity score based on all pieces of metadata. For example, the total popularity score may be calculated based on predetermined metadata. Conversely, the CPU 301 may calculate the total popularity score by excluding predetermined metadata.

Details of the three count values and the flow of calculating a total popularity score will be described below.

First of all, three count values associated with each piece of metadata, i.e., "the number of times of addition", "the number of times of deletion", and "the remaining number" will be described below.

The first count value (number of times of addition) denotes the cumulative number of times in which a photograph selected by the user contains the metadata in step S404. The second count value (number of times of deletion) denotes the cumulative number of times in which a photograph removed from the album by the user contains the metadata in step S404. Each time the CPU 301 receives a photograph revision request from the user in step S404, the CPU 301 increments by one the number of times of addition 904 and the number of times of deletion 905 stored in the metadata management table 507 with respect to metadata of the photograph requested to be revised.

Figure 15A:
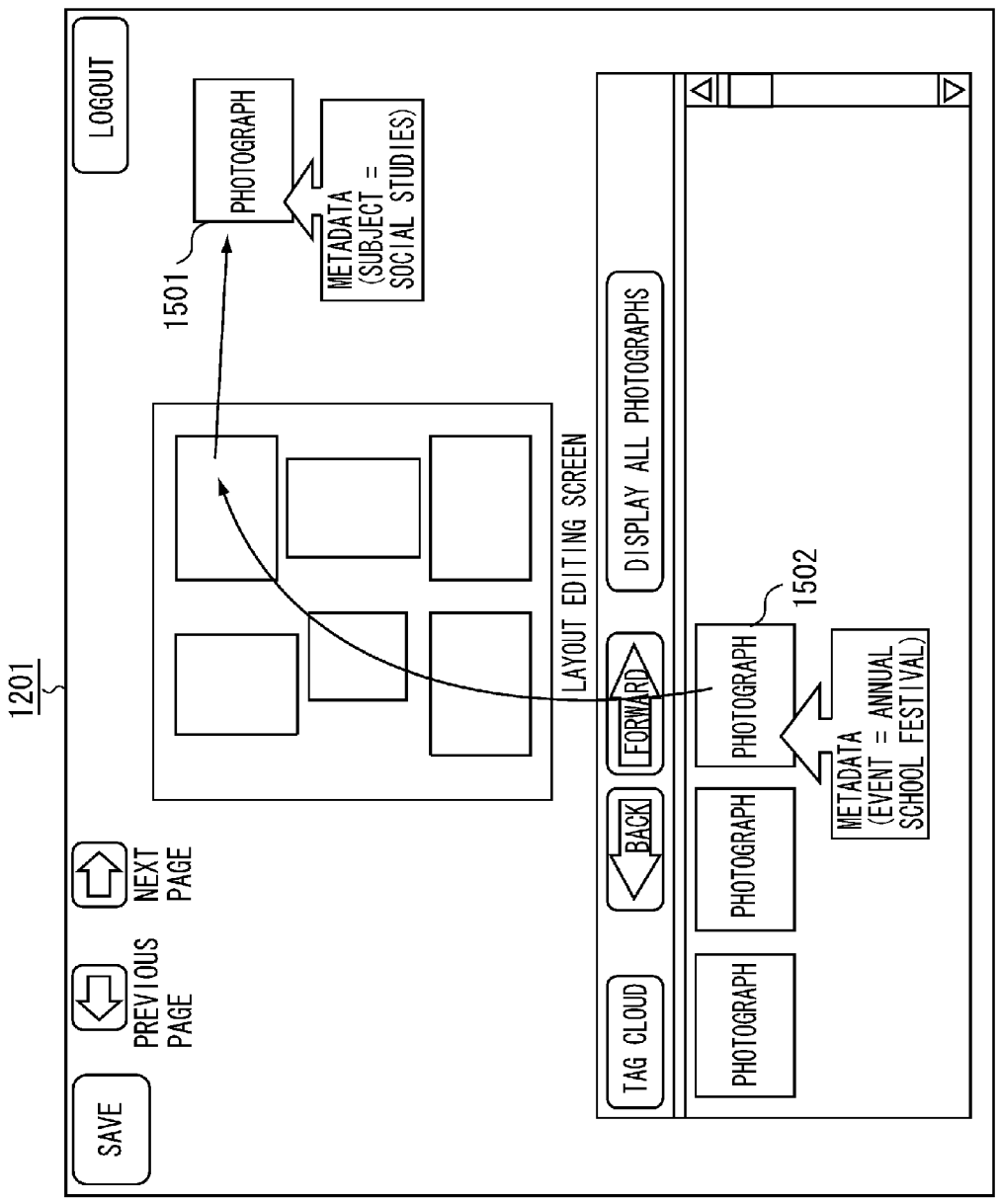

FIGS. 15A and 15B illustrate a concept of updating the number of times of addition and the number of times of deletion based on a photograph revision request from the user. FIG. 15A illustrates a case where a photograph revision request to change a photograph 1501 to a photograph 1502 is received from the user. The CPU 301 increments by one the number of times of deletion 905 for the metadata added to the photograph 1501 (key="Subject", value="Social studies" in FIG. 15B). On the other hand, the CPU 301 increments by one the number of times of addition 904 of the metadata added to the photograph 1502 (key="Event", value="Annual school festival" in FIG. 15B).

The third count value (remaining number) denotes the number of times in which a photograph retained in the album contains the metadata since the editing period was started (initial state) until a total popularity score is calculated in step S404. For example, a photograph CC.jpg is present in the album when a certain user starts editing (initial state) and remains in it until a total popularity score is calculated. In this case, the CPU 301 increments by one the remaining number of metadata added to the photograph CC.jpg.

Figure 16:
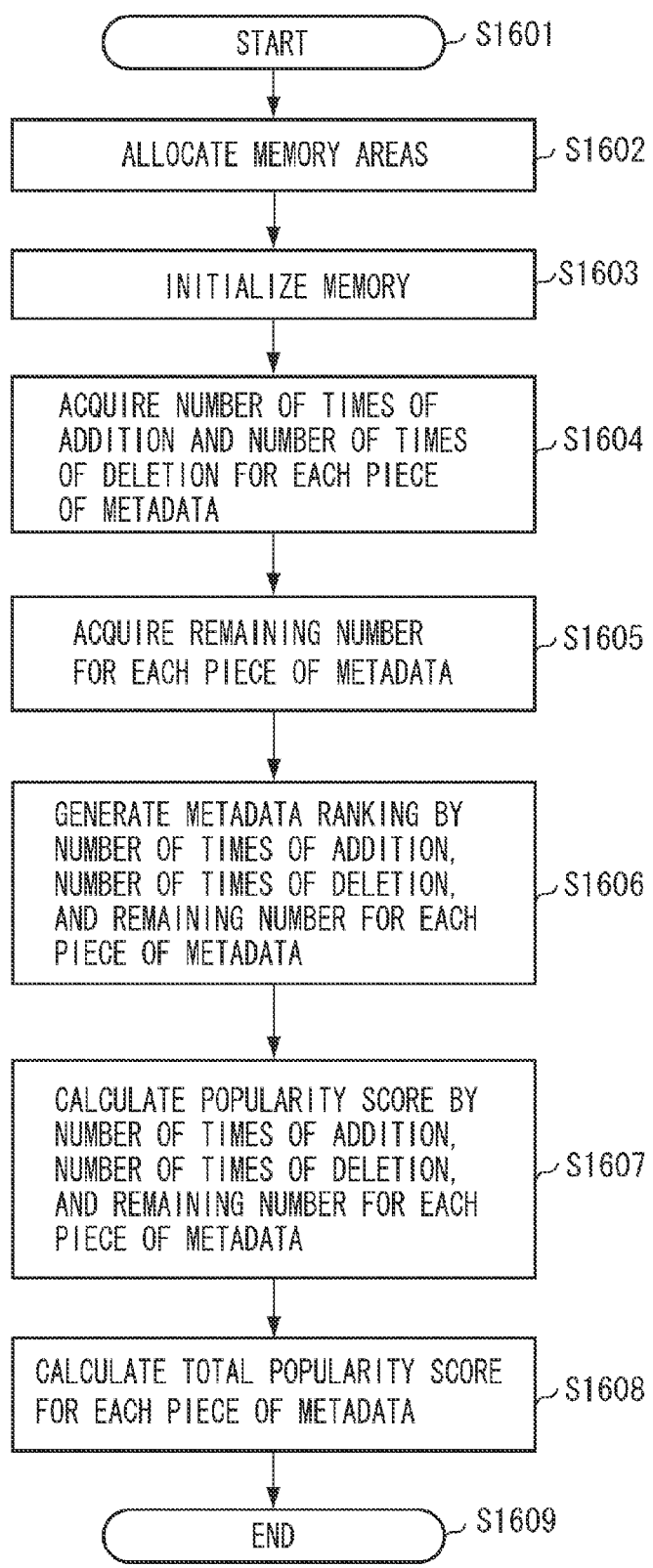
FIG. 16 is a flow chart illustrating processing for calculating a total popularity score.

Processing for calculating a total popularity score will be described below with reference to FIG. 16. FIG. 16 is a flow chart illustrating processing for calculating a total popularity score. The CPU 301 performs processing of the flow chart in FIG. 16 at predetermined intervals for each piece of metadata to calculate a total popularity score. In this way, the total popularity score changes every moment. The CPU 301 receives a setting of interval for calculating a total popularity score from the user in steps S401 to S403. For example, the user inputs an interval of one hour, 30 minutes, or 5 minutes. Although a case where a total popularity score is calculated at predetermined intervals has been described above, the CPU 301 may calculate a total popularity score at a timing in conjunction with the amount of work by the user. For example, the CPU 301 may calculate a total popularity score each time ten users log in, or each time five users revise a photograph.

Processing in each step of the flow chart in FIG. 16 will be described in detail below.

In step S1601, the CPU 301 starts processing.

In step S1602, the CPU 301 allocates memory areas for storing in the RAM 305 various data necessary in the flow chart in FIG. 16. The processing in FIG. 16 requires memory areas for storing the number of times of addition, the number of times of deletion, and the remaining number for each piece of metadata. Further, step S1606 requires memory areas for storing a result of sorting metadata by the above-mentioned three count values, and step S1607 requires memory areas for storing the value of the popularity score obtained from the result of sorting. The CPU 301 allocates areas for storing these pieces of data.

In step S1603, the CPU 301 initializes the allocated memory areas.

In step S1604, the CPU 301 acquires the number of times of addition and the number of times of deletion from the field of the number of times of addition 904 and the number of times of deletion 905, respectively, in the metadata management table 507 for each piece of metadata, and loads them into the memory areas allocated in step S1602.

In step S1605, the CPU 301 counts the remaining number for each piece of metadata. The count values are stored in the memory areas in the RAM 305 allocated in step S1602, and incremented by the CPU 301. A method for counting the remaining number will be described in detail below with reference to FIG. 18.

In step S1606, the CPU 301 generates a metadata ranking by the number of times of addition, the number of times of deletion, and the remaining number of each piece of metadata. More specifically, the CPU 301 determines the order of metadata for each of cases where metadata is sorted by the number of times of addition in descending order, by the number of times of deletion in descending order, and by the remaining number in descending order. In the present exemplary embodiment, the ranking by the number of times of addition refers to a list of metadata sorted by the number of times of addition in descending order. The ranking by the number of times of deletion refers to a list of metadata sorted by the number of times of deletion in descending order. The ranking by the remaining number refers to a list of metadata sorted by the remaining number in descending order.

When generating a metadata ranking, instead of simply sorting metadata by each of the above-mentioned three count values, the CPU 301 may also sort metadata by each of these count values respectively divided by the number of photographs added to the metadata. In this case, the ranking can be determined not by the number of times of selection by the user but by the rate of selection by the user. For example, suppose that a certain metadata A is added to a hundred photographs and that a certain metadata B is added to three photographs. Further, suppose that the number of times of addition for the metadata A is 5 and the number of times of addition for the metadata B is 4. In this case, the metadata A comes to a higher rank than the metadata B when metadata is sorted simply by the number of times of addition. On the other hand, when generating a ranking by the rate of selection by the user, the metadata B comes to a higher rank than the metadata A since the relevant value for the metadata A is 5/100 and that for the metadata B is 4/3. The album producing apparatus 103 may also preferably receive in advance a user instruction to specify whether comparison is made with the number of times of selection or the rate of selection.

In step S1607, the CPU 301 gives a popularity score to each piece of metadata ranging from the metadata of the first ranking to the metadata of a predetermined ranking. Specifically, the CPU 301 stores in the memory areas allocated in step S1602 a positive score for metadata within the ranking by the number of times of addition and the remaining number, and a negative score for metadata within the ranking by the number of times of deletion. The album producing apparatus 103 may also preferably receive in advance a user instruction to specify a range of metadata ranking to which a popularity score is given and the number of scores given to each rank.

In step S1608, the CPU 301 performs processing for calculating a total popularity score for each piece of metadata. To calculate a total popularity score, the CPU 301 uses a formula for varying with time the weight only of the popularity score obtained from the ranking by the remaining number. An exemplary formula used for calculating a total popularity score is illustrated below.

Total popularity score=

(Popularity score obtained from ranking by the number of times of addition)+

(Popularity score obtained from ranking by the number of times of deletion)+

(Popularity score obtained from ranking by the remaining number)×Weight($t$)

Figure 17:
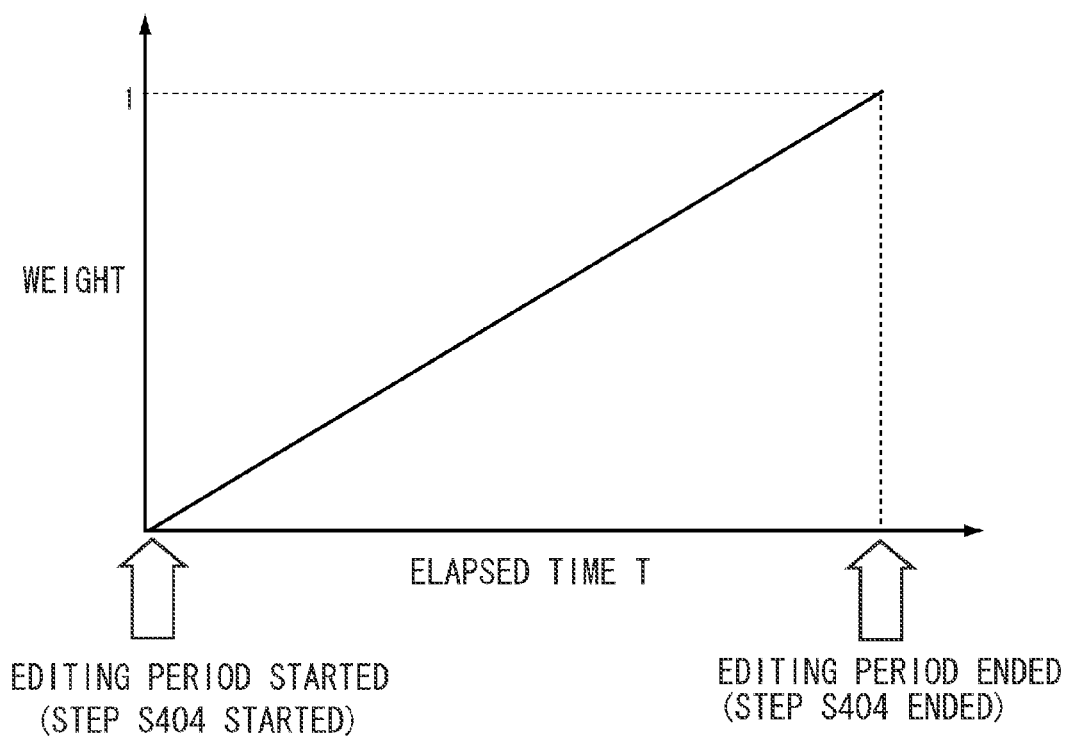
FIG. 17 is an exemplary graph illustrating a weight of popularity score varying with time.

How and why the weight is varied with time will be described below with reference to FIG. 17.

In step S1609, the CPU 301 ends processing.

Figure 18:
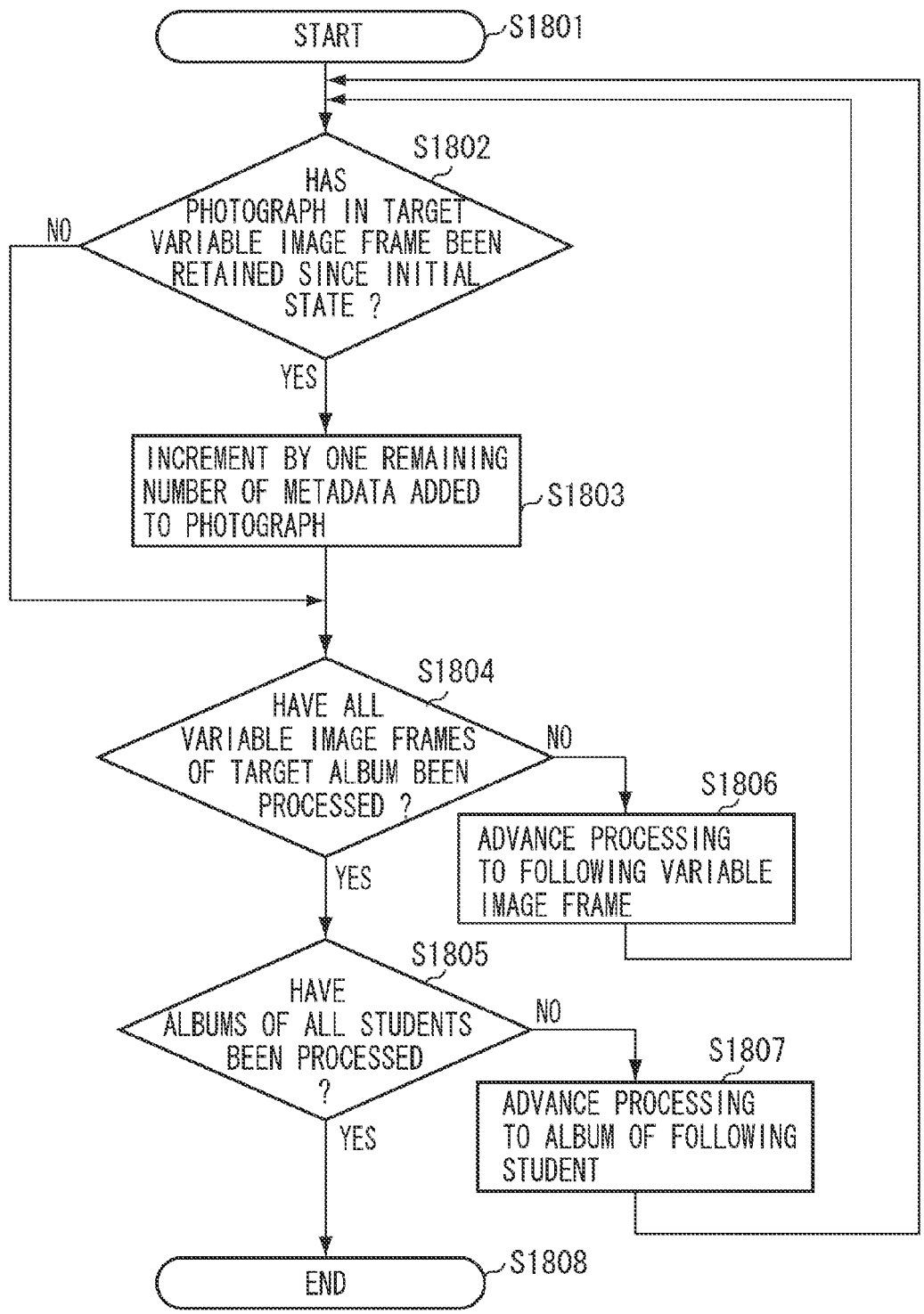
FIG. 18 is a flow chart illustrating exemplary processing for counting the remaining number of each piece of metadata.

Processing for counting the remaining number for each piece of metadata by the CPU 301 in step S1605 will be described below. FIG. 18 is a flow chart illustrating exemplary processing for counting the remaining number for each piece of metadata.

In step S1801, the CPU 301 starts processing.

In step S1802, the CPU 301 determines whether a photograph in the target variable image frame in the target album has been retained since the initial state. The CPU 301 references the revision history data 602 corresponding to the target album in the album layout data 503 and then checks the revision flag for the target variable image frame to make the above-mentioned determination. When the CPU 301 determines that the photograph has been retained since the initial state, the CPU 301 advances processing to step S1803. When the CPU 301 determines that the photograph has been revised since the initial state, the CPU 301 skips step S1803 and advances processing to step S1804.

In step S1803, the CPU 301 increments by one the remaining number of metadata added to the photograph determined to have been retained since the initial state in step S1802. The CPU 301 references the photographic data/metadata correspondence table 508 to determine which metadata is added to the above-mentioned photograph. Then, the CPU 301 increments by one the remaining number corresponding to the relevant metadata among the memory areas allocated in the RAM 305.

In step S1804, the CPU 301 determines whether all variable image frames of the target album have been processed.

In step S1805, the CPU 301 determines whether albums of all students have been processed.

In step S1806, the CPU 301 advances processing to the following variable image frame.

In step S1807, the CPU 301 advances processing to the album of the following student.

In step S1808, the CPU 301 ends processing.

As mentioned above, when calculating a total popularity score for each piece of metadata in step S1608, the CPU 301 uses a formula for varying with time the weight of the popularity score obtained from the ranking by the remaining number.

More specifically, the CPU 301 adjusts the weight of the popularity score obtained from the ranking by the remaining number so that it is minimized when the editing period is started (in step S404), increased with time, and maximized when the editing period is ended (in step S404). FIG. 17 is a graph illustrating the weight of the popularity score varying with time. FIG. 17 is not limited to a linear graph, but may be a nonlinear graph.

A reason why the weight is varied in this way will be described below. When the editing period is started (initial state), the album for each user presents only photographs automatically determined by the CPU 301 according to the image layout rule set in each variable image frame. This means that user preferences are not necessarily reflected to the degree of popularity. Therefore, a smallest weight is applied to the popularity score obtained from the ranking by the remaining number when the editing period is started (initial state). The user replaces photographs which are not his or her favorites with favorites. On the other hand, when the album presents user's favorite photographs when the editing period is started (initial state), the photographs have been retained in an album without being replaced.

A certain photograph has been retained in the album since when the editing period was started (initial state) possibly because "the photograph is a user's favorite" or because "the photograph has not yet been revised (for a certain reason) although it is not a user's favorite." More specifically for the latter reason, for example, the user has been editing other pages and has not yet reviewed the relevant photograph, or has to revise other photographs before the relevant one. However, it is presumed that the possibility that a photograph is retained for the latter reason decreases with increasing elapsed time during which the user utilizes the system.

For the above-mentioned reasons, the CPU 301 increases the weight of the popularity score obtained from the ranking by the remaining number according to the elapsed time within the editing period so that the weight is maximized when the system operation is ended. In comparison with a case where the weight of the popularity score remains unchanged with time, varying the weight with time can reduce cases where the popularity score obtained from the ranking by the remaining number increases because "a photograph has not yet been revised (for a certain reason) although it is not a user's favorite." These measures enable obtaining the effect that user preferences can be more appropriately reflected to the total popularity score.

Based on the total popularity score for each piece of metadata calculated in step S1608, the CPU 301 calculates the font size when displaying each piece of metadata as a tag cloud. More specifically, the CPU 301 displays the name of metadata having a high total popularity score in large font size, and displays the name of metadata having a low total popularity score in small font size.

An exemplary formula used for calculating the font size is illustrated below.

$$\text{Font size} = ((\text{SizeMax} - \text{SizeMin})/\text{PointMax}) \times Px + \text{SizeMin}$$

where Px denotes the total popularity score of the target metadata, SizeMax denotes the maximum font sizes, SizeMin denotes the minimum font sizes, and PointMax denotes the highest total popularity score of metadata.

For example, the album producing apparatus 103 may receive in advance a user instruction to specify values of SizeMax, SizeMin, and PointMax.

Although the above-mentioned formula is a linear formula, but it may be a nonlinear formula.

The CPU 301 may display photographs with metadata having a high total popularity score in large font size in the candidate photograph list display region 1203. Conversely, the CPU 301 may display photographs with metadata having a low total popularity score in small font size in the candidate photograph list display region 1203.

This enables the user to easily distinguish photographs having popular metadata added thereto.

In the first exemplary embodiment, in step S1608, the CPU 301 increased the weight of the popularity score obtained from the ranking by the remaining number when calculating a total popularity score according to the elapsed time within the album editing period.

The first exemplary embodiment is on the premise that the cumulative number of times in which photographs of the album are replaced by the user increases in proportion to the elapsed time. Therefore, when the number of photographs on the album revised by the user is not in proportion to the elapsed time, user preferences may not be suitably reflected to the total popularity score. For example, there may be a case where many users start revising photographs when the editing period almost ends. In this case, immediately before many users start revising photographs, there is an increase in the remaining number of metadata retained in the album because "a photograph has not yet been revised (for a certain reason) although it is not a user's favorite." In this case, user preferences may not suitably be reflected to the total popularity score.

A second exemplary embodiment, in consideration of the above-mentioned case, calculates the frequency at which each user replaces photographs in his or her album as "usage rate of user." The CPU 301 calculates the weight of the popularity score obtained from the ranking by the remaining number based on the usage rate of user. An exemplary formula used for calculating the usage rate of user is illustrated below.

Usage rate of user=

((Number of users who have revised at least one photograph)/(Number of users expected to finally revise their respective photographs))×((Average number of photographs revised by users who have revised at least one photograph)/(Average number of photographs expected to be finally revised by users))

The above-mentioned formula calculates the usage rate of user based on "the number of users expected to finally revise their respective photographs" and "the average number of photographs expected to be finally revised." For example, suppose that the number of users expected to finally revise their respective photographs is 30, and the average number of photographs expected to be finally revised is 5. At the timing of calculation of a total popularity score, when 20 users have revised at least one photograph and each of these users has revised four photographs in average, the usage rate of user is 0.533.

Figure 19:
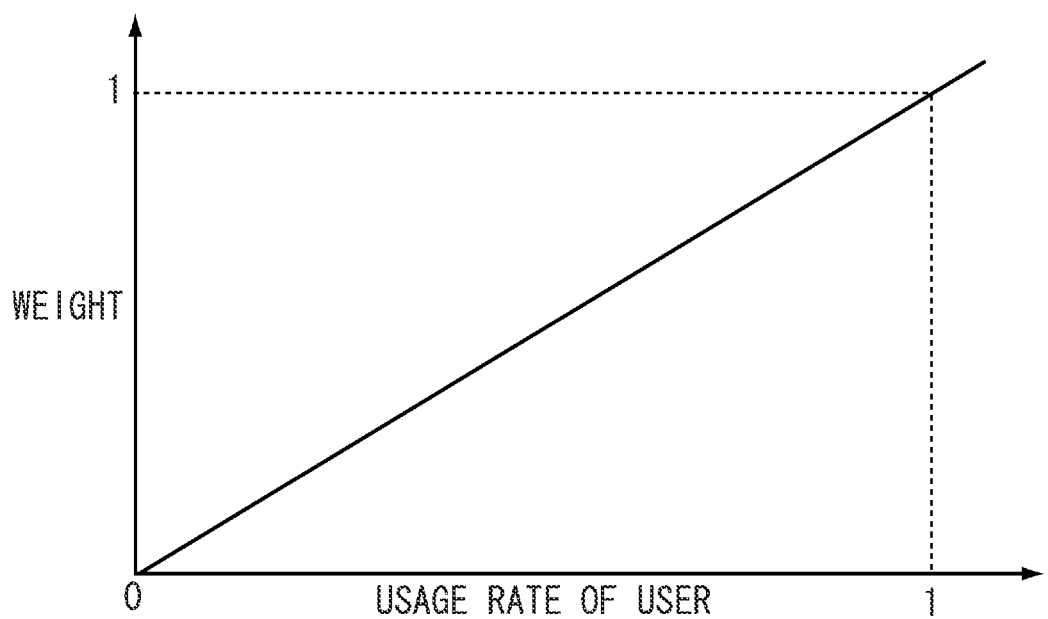
FIG. 19 is an exemplary graph illustrating a relation between the weight of popularity score obtained from the ranking by the remaining number of each piece of metadata and the usage rate of user.

FIG. 19 is an exemplary graph illustrating a relation between the weight of popularity score obtained from the ranking by the remaining number for each piece of metadata and the usage rate of user. Although the weight is linearly increased with increasing usage rate of user in FIG. 19, the weight may also be nonlinearly increased.

The above processing enables suitably reflecting user preferences to the total popularity score even when the number of photographs in the album revised by the user is not in proportion to the elapsed time.

According to the above-mentioned exemplary embodiments, when at least two users are editing their respective albums, it becomes possible to evaluate the degree of popularity of metadata added to a photograph retained in VDP data without being replaced because it is a user's favorite, as well as the degree of popularity of the photograph itself. This enables calculating the degree of popularity to which user preferences are suitably reflected.

Further, according to the above-mentioned exemplary embodiments, user preferences can be suitably reflected to the degree of popularity of content data such as photographs as well as the degree of popularity of metadata.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-116900 filed May 13, 2009, which is hereby incorporated by reference herein in its entirety.

What is claimed is:

1. An information processing apparatus including at least one processor communicatively-coupled to a memory via a bus, comprising:

a generation unit configured to generate an album including a plurality of frames in which a plurality of images are to be arranged, wherein at least one or more pieces of metadata is added to at least one of the plurality of images of the album;

a changing unit configured to change one of the plurality of images arranged in one of the plurality of frames in the generated album to another image of the plurality of images according to a user's instruction;

a calculation unit configured to calculate ranking information for each piece of the at least one or more pieces of metadata;

a determination unit configured to determine whether an image from the plurality of images has been retained in one of the plurality of frames in the album being unchanged to another image of the plurality of images according to the user's instruction by the changing unit, during a time period, from a time beginning at the start of changing an image by the changing unit, to a time when ranking information is calculated by the calculation unit;

an obtaining unit configured, in response to a determination that an image was unchanged, to obtain the at least one or more pieces of metadata added to the image determined by the determination unit; and a first counting unit configured to count a number of images to which the at least one or more pieces of metadata obtained by the obtaining unit is added and which are retained in the album for each piece of the at least one or more pieces of metadata obtained by the obtaining unit, wherein the calculation unit calculates the ranking information based on the number counted by the first counting unit for each piece of the at least one or more pieces of metadata obtained by the obtaining unit.

2. The information processing apparatus according to claim 1, further comprising a display unit configured to display the at least one or more pieces of metadata added to one of the plurality of images in a graphical user interface (GUI) according to the ranking information of the metadata.

3. The information processing apparatus according to claim 2, wherein the display unit changes a GUI font size of information indicating the at least one or more pieces of metadata based on the ranking information of metadata calculated by the calculation unit.

4. The information processing apparatus according to claim 1, further comprising an addition unit configured to add the at least one or more pieces of metadata to the at least one of the plurality of images according to the user's instruction.

5. The information processing apparatus according to claim 1, further comprising:

a second counting unit configured to count a number of times the at least one or more pieces of metadata is added to the another image of the at least one of the plurality of images changed by the changing unit, wherein the number counted is incremented every time the one of the plurality of images is newly arranged in the one of the plurality of frames by the changing unit; and a third counting unit configured to increment a count a number of times the at least one or more pieces of metadata is deleted when the one of the plurality of images changed by the changing unit is changed in the one of the plurality of frames to the another image of the at least one of the plurality of images changed by the changing unit, wherein the calculation unit calculates the ranking information based on the numbers counted by the first counting unit, the second counting unit and the third counting unit.

6. The information processing apparatus according to claim 1,
wherein the calculation unit calculates the ranking information according to a time period beginning at the start of changing an image by the changing unit to a time when ranking information is calculated by the calculation unit.

7. The information processing apparatus according to claim 1, further comprising
an evaluation unit configured to evaluate one of the plurality of images based on the ranking information of the at least one or more pieces of metadata added to the one of the plurality of images.

8. An information processing method comprising:
generating an album including a plurality of frames in which a plurality of images are arranged,
wherein at least one of more pieces of metadata is added to at least one of the plurality of images of the album;
changing one of the plurality of images arranged in one of the plurality of frames in the generated album to another image of the plurality of images according to a user's instruction;
calculating ranking information for each piece of the at least one or more pieces of metadata;
determining whether an image from the plurality of images has been retained in one of the plurality of frames in the album being unchanged to another image of the plurality of images according to the user's instruction, during a time period, from a time beginning at the start of changing an image, to a time when ranking information is calculated;
obtaining, in response to a determination that an image was unchanged, the at least one or more pieces of metadata added to the image determined; and
counting a number of images to which the at least one or more pieces of metadata obtained is added and which are retained in the album for each piece of the at least one or more pieces of metadata obtained,
wherein the ranking information is calculated based on the number counted for each piece of the at least one or more pieces of metadata obtained.

9. A non-transitory computer-readable medium storing a program for causing a computer to perform the information processing method according to claim 8.

* * * * *